(12) United States Patent
Chan et al.

(10) Patent No.: US 8,743,067 B2
(45) Date of Patent: Jun. 3, 2014

(54) SIGNAL-TO-NOISE RATIO ENHANCING TOUCH SENSING APPARATUS USING CHARGE PUMP METHOD

(75) Inventors: Chien-Yu Chan, Hsinchu (TW); Chien-Kuo Wang, Zhubei (TW); Shang-Ping Tang, Hsinchu (TW); Hung Li, Taipei (TW); Ko-Yang Tso, New Taipei (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 200 days.

(21) Appl. No.: 13/340,063

(22) Filed: Dec. 29, 2011

(65) Prior Publication Data
US 2012/0169662 A1    Jul. 5, 2012

(30) Foreign Application Priority Data
Jan. 4, 2011   (TW) .............................. 100100190 A

(51) Int. Cl.
*G06F 3/041* (2006.01)
(52) U.S. Cl.
USPC .......................................................... 345/173
(58) Field of Classification Search
USPC .......................................................... 345/173
See application file for complete search history.

(56) References Cited

U.S. PATENT DOCUMENTS

| | | | | |
|---|---|---|---|---|
| 4,581,483 A * | 4/1986 | Ralston | ...................... | 178/20.01 |
| 5,898,136 A * | 4/1999 | Katsurahira | ................ | 178/18.01 |
| 5,940,064 A * | 8/1999 | Kai et al. | ..................... | 345/173 |
| 8,124,892 B2 * | 2/2012 | Yeh | ............................ | 178/18.01 |
| 8,154,525 B2 * | 4/2012 | Katsurahira | ................... | 345/173 |
| 2006/0055679 A1 * | 3/2006 | Grinshpoon et al. | .......... | 345/173 |
| 2010/0295810 A1 * | 11/2010 | Nagata et al. | ................. | 345/173 |
| 2011/0025644 A1 * | 2/2011 | Lin et al. | ....................... | 345/174 |
| 2011/0310040 A1 * | 12/2011 | Ben-Shalom et al. | ......... | 345/173 |
| 2012/0044158 A1 * | 2/2012 | Chang et al. | .................. | 345/173 |

\* cited by examiner

*Primary Examiner* — Chanh Nguyen
*Assistant Examiner* — Roy Rabindranath

(57) ABSTRACT

A touch sensing apparatus is disclosed. The touch sensing apparatus includes a logic control module, at least one storage control module, and at least one decoding control module. The logic control module is used to generate a plurality of control signals having different control timings. The plurality of control signals includes a storage control signal and a decoding control signal. Each storage control module includes a plurality of storage capacitors, and respectively stores each of sensed voltages in different storage capacitors at different times according to a storage control timing of the storage control signal. The sensed voltages are analog data sensed from scan lines of an ITO sensor. The decoding control module performs analog adding process to the sensed voltages stored in the storage capacitors according to a decoding control timing of the decoding control signal to output decoded analog data with high signal-to-noise ratio (SNR).

10 Claims, 2 Drawing Sheets

SIGNAL-TO-NOISE RATIO ENHANCING TOUCH SENSING APPARATUS USING CHARGE PUMP METHOD

BACKGROUND OF THE INVENTION

1. Field of the Invention

The invention relates to touch sensing, in particular, to a touch sensing apparatus using the charge pump concept to realize the function of analog adder, so that the interference to touch sensing caused by the liquid crystal panel and external environment noise will be reduced to enhance system signal-to-noise ratio (SNR) without an amplifier to lower the cost.

2. Description of the Prior Art

With the rapid progress of technology, the conventional display has been replaced by TFT-LCD gradually, and the TFT-LCD is widely used in various electronic products such as television, flat display, mobile, tablet PC, and projector. As to the TFT-LCD with touch control function, touch sensor is one of the important modules of the TFT-LCD, and the performance of the touch sensor will also directly affect the entire effectiveness of the TFT-LCD.

In general, the conventional LCD with mutual inductance capacitor touch function includes a display panel, an ITO sensor, and a touch control chip. Wherein, the ITO sensor includes a plurality of sensing lines and driving lines, and the touch control chip includes a plurality of pins. The sensing lines are coupled to the pins respectively. After the driving line transmits a driving pulse and couples a small voltage at the sensing line, the touch control chip will sense the coupled voltage and judge whether the ITO sensor is touched according to the coupled voltage.

However, the above-mentioned conventional LCD touch sensing method has serious drawbacks, such as the scanning rate is too low, the operation of the touch control chip is seriously affected by the noise generated by the display panel, even the touch point is misjudged. In order to avoid the noise generated by the panel, a layer of insulating material is disposed between the ITO sensor and the panel; however, this method will increase the cost, and the thickness of the entire apparatus will be increased, it is unfavorable to the design of mechanism. In addition, since an amplifier is necessary for the conventional touch sensing apparatus to amplify the sensed coupling voltage, the die size is hard to be shrunk to lower the cost.

Therefore, the invention provides a touch sensing apparatus using the charge pump concept to realize the function of analog adder to solve the above-mentioned problems.

SUMMARY OF THE INVENTION

A scope of the invention is to provide a touch sensing apparatus. In an embodiment of the invention, the touch sensing apparatus includes a logic control module, at least one storage control module, and at least one decoding control module. The logic control module is used for generating a plurality of control signals having different control timings, and the plurality of control signals includes a storage control signal and a decoding control signal. Each storage control module includes a plurality of storage capacitors and respectively stores each of sensed voltages in different storage capacitors at different times according to a storage control timing of the storage control signal, wherein the sensed voltages are analog data sensed from scan lines of an ITO sensor. The at least one decoding control module is used for performing analog adding process to the sensed voltages stored in the storage capacitors according to a decoding control timing of the decoding control signal to output decoded analog data with high signal-to-noise ratio (SNR).

In practical applications, each storage control module further includes at least one adding switch, and each adding switch is coupled between two storage capacitors. After the storage control module stores each of sensed voltages in different storage capacitors at different times, the storage control module will switch off the at least one adding switch at the same time, so that the storage capacitors can conduct to each other. By doing so, the decoding control module can perform the analog adding process by using charge pump method to add the sensed voltages stored in different storage capacitors to output the decoded analog data with high SNR.

Compared to the prior arts, the touch sensing apparatus of the invention uses the charge pump concept to realize the function of analog adder, not only the interference to touch sensing caused by the noise generated by the liquid crystal panel and external environment can be effectively reduced, but also the reporting rate of the entire system will be not lowered and the power consumption will be increased, therefore, the touch sensing apparatus can sense the touch points on the touch panel more accurately to largely reduce the probability of misjudgment. In addition, because the touch sensing apparatus of the invention can obtain high SNR amplified analog data without any amplifier, the die size can be shrunk to lower the cost.

The advantage and spirit of the invention may be understood by the following detailed descriptions together with the appended drawings.

DETAILED DESCRIPTION

A first embodiment of the invention is a touch sensing apparatus. In this embodiment, the touch sensing apparatus can be a mutual inductance capacitor touch sensing apparatus capable of sensing a plurality of data from an ITO sensor at the same time and avoiding the misjudgment of touch points caused by the sensed data affected by the noise of the LCD panel.

Figure 1:
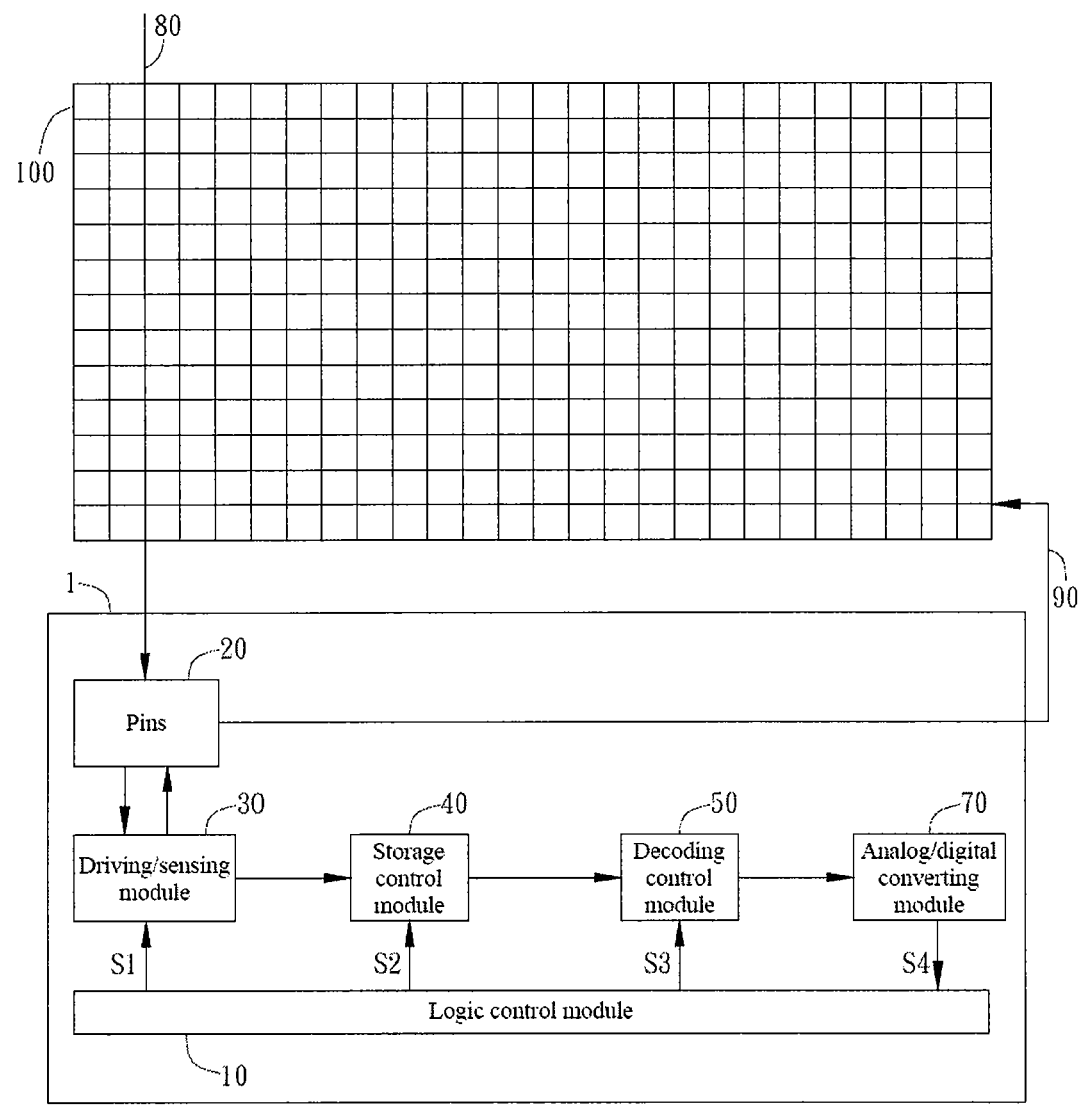
FIG. 1 illustrates a schematic figure of the touch sensing apparatus sensing the touch points on the ITO sensor in the invention.

Please refer to FIG. 1. FIG. 1 illustrates a schematic figure of the touch sensing apparatus sensing the touch points on an ITO sensor in the invention. As shown in FIG. 1, the liquid crystal display includes an ITO sensor 100 and a touch sensing apparatus 1. In general, the LCD panel is attached under the ITO sensor 100, but not limited to this. The touch sensing apparatus 1 includes a logic control module 10, a plurality of pins 20, at least one driving/sensing module 30, at least one storage control module 40, at least one decoding control module 50, and an analog/digital converting module 70.

Wherein, the driving/sensing module 30, the storage control module 40, the decoding control module 50, and the analog/digital converting module 70 are all modules for processing analog signals, and the logic control module 10 is a module for processing digital signals. The driving/sensing module 30 is coupled to the logic control module 10 and the plurality of pins 20; the storage control module 40 is coupled to the logic control module 10 and the driving/sensing module 30; the decoding control module 50 is coupled to the logic control module 10 and the storage control module 40; the analog/digital converting module 70 is coupled to the decoding control module 50 and the logic control module 10.

In this embodiment, the logic control module 10 is used for generating a plurality of control signals having different control timings. For example, the logic control module 10 can generate a driving/sensing signal S1, a storage control signal S2, and a decoding control signal S3. Wherein, the driving/sensing control signal S1, the storage control signal S2, and the decoding control signal S3 have a driving/sensing control timing, a storage control timing, and a decoding control timing respectively and used to control the driving/sensing module 30, the storage control module 40, and the decoding control module 50 respectively, but not limited to this.

It should be noticed that the plurality of pins 20 of the touch sensing apparatus 1 has more than one function, and the plurality of pins 20 can be switched among different functions according to practical needs, such as a driving function, a sensing function, a ground function, and a floating function, but not limited to these functions.

When the at least one driving/sensing module 30 receives the driving/sensing control signal S1 from the logic control module 10, the driving/sensing module 30 will control the plurality of pins 20 to perform the plurality of functions respectively according to the driving/sensing control timing of the driving/sensing control signal S1, so that the plurality of pins 20 can sense a plurality of analog data (sensed voltages) from the ITO sensor 100 at the same time, and store the plurality of analog data in storage capacitances of the at least one storage control module 40.

As shown in FIG. 1, the ITO sensor 100 includes a plurality of sensing lines 80 and a plurality of driving lines 90, and the plurality of sensing lines 80 and the plurality of driving lines 90 are vertical to each other. It should be noticed that the sensing lines 80 and the driving lines 90 are interchangeable. That is to say, 90 of FIG. 1 can also be sensing lines, and 80 of FIG. 1 can also be driving lines, and the interchange can be controlled by the touch sensing apparatus 1. In this embodiment, because different pins 20 can scan a driving line 90 respectively, and sense the plurality of sensing lines 80 at the same time, the plurality of pins 20 can sense the plurality of analog data (sensed voltages). In fact, the logic control module 10 of the touch sensing apparatus 1 can select a specific pin of the plurality of pins 20 to control to sense at a specific timing.

It should be noticed that the logic control module 10 can generate the control signals S1~S3 having different control timings according to an external synchronous signal, or the logic control module 10 can also generate the control signals S1~S3 having different control timings on its own without the external synchronous signal, so that when the pins 20 senses analog data, the time period of the noise generated by the LCD panel can be avoided and the analog data sensed by the pins 20 will not be affected by the noise.

It should be noticed that because the main technologic feature of the invention is the storage control module 40 and the decoding control module 50 of the touch sensing apparatus 1, the circuit structure and functions of the storage control module 40 and the decoding control module 50 will be introduced in detail as follows.

Figure 2:
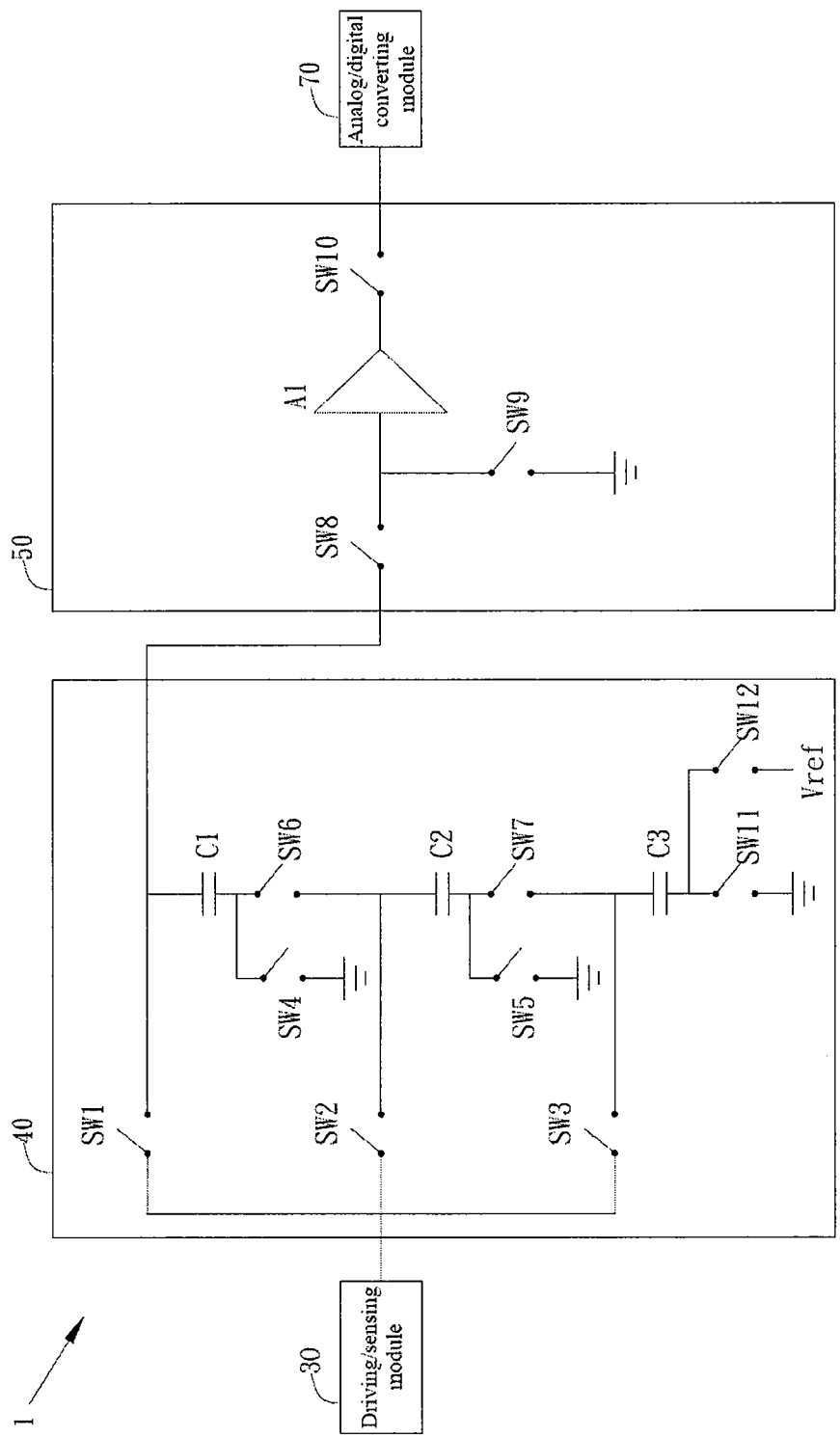
FIG. 2 illustrates a circuit schematic figure of an embodiment of the storage control module and the decoding control module of the touch sensing apparatus.

Please refer to FIG. 2. FIG. 2 shows a circuit schematic figure of single storage control module 40 and single decoding control module 50 of the touch sensing apparatus 1. As shown in FIG. 2, each storage control module 40 includes a plurality of storage capacitors C1~C3, switches SW1~SW3, and switches SW11~SW12. Wherein, the switches SW1~SW3 are charging switches corresponding to the storage capacitors C1~C3 respectively; the switches SW4~SW5 and SW11 are ground switches; the switches SW6~SW7 are adding switches; SW2 is reference voltage switch. The charging switches SW1~SW3 are coupled between the storage capacitors C1~C3 and the driving/sensing module 30 respectively; the switch SW4 is coupled between the storage capacitor C1 and the ground end; the switch SW5 is coupled between the storage capacitor C2 and the ground end; the switch SW6 is coupled between the storage capacitors C1 and C2; the switch SW7 is coupled between the storage capacitors C2 and C3; the switch SW11 is coupled between the storage capacitor C3 and the ground end; the switch SW12 is coupled between the storage capacitor C3 and the reference voltage (fixed voltage) Vref. It should be noticed that the number of storage capacitors and the corresponding switches of each storage control module 40 is not limited to three, and each storage control module 40 can also include multiple sets of storage capacitors and corresponding switches.

When the storage control module 40 receives the storage control signal S2 from the logic control module 10, the storage control module 40 will receive the analog data (sensed voltages) sensed by pins 20 from the driving/sensing module 30 and store each analog data in different storage capacitors C1~C3 at different times respectively according to the storage control timing of the storage control signal S2. In fact, the storage control module 40 controls whether each analog data is stored in the storage capacitors C1~C3 by switching on or off the switches SW1~SW3.

For example, if the charging switches SW1~SW3, the ground switches SW4~SW5 and SW11, and the adding switches SW6~SW7 and SW12 are all under ON state, at a first time, the storage control module 40 switches off the charging switch SW1 and the ground switch SW4 and keeps the charging switches SW2 and SW3 under ON state, a first analog data outputted from the driving/sensing module 30 can be stored in the storage capacitor C1; at a second time, the storage control module 40 switches off the charging switch SW2 and the ground switch SW5 and keeps the charging switches SW1 and SW3 under ON state, a second analog data outputted from the driving/sensing module 30 can be stored in the storage capacitor C2; at a third time, the storage control module 40 switches off the charging switch SW3 and the ground switch SW11 and keeps the charging switches SW1 and SW2 under ON state, a third analog data outputted from the driving/sensing module 30 can be stored in the storage capacitor C3. Therefore, the storage control module 40 can store each analog data outputted from the driving/sensing module 30 in different storage capacitors C1~C3 at different times respectively.

It should be noticed that the order and method of the storage control module 40 controlling the charging switches SW1~SW3 on or off are not limited by the above-mentioned cases, the charging switches SW1~SW3 can be switched off at the same time or switched on different times to enhance the scanning rate and report rate of the apparatus, so that it can be adjusted based on practical needs.

In practical applications, after the storage control module 40 store all analog data outputted from the driving/sensing module 30 in the storage capacitors C1~C3, the switches SW1~SW3 can be switched on and the ITO sensor 100 will be controlled to perform a discharge process to avoid the environmental noise affecting the operation of the control chip and avoid the residual charges on the ITO sensor 100 affecting the sensing accuracy of the pins 20.

Then, how the touch sensing apparatus 1 uses the charge pump concept to realize the function of analog adder will be introduced as follows. After the storage control module 40 store all analog data (sensed voltages) outputted from the driving/sensing module 30 in the storage capacitors C1~C3, the charging switches SW1~SW3 and the ground switches SW4~SW5 are under ON state, and the switch SW6 coupled between the storage capacitors C1 and C2, the switch SW7 coupled between the storage capacitors C2 and C3, and the switch SW12 coupled between the storage capacitor C3 and the reference voltage Vref will be switched off simultaneously at a fourth time. The switches SW6, SW7, and SW12 can be also switched off at different times, so that the storage capacitors C1~C3 can conduct to each other. If the charges stored in the storage capacitors C1~C3 are Q1~Q3 respectively, at this time, the charges Q1~Q3 stored in the storage capacitors C1~C3 can be added.

By doing so, the touch sensing apparatus 1 can use the above-mentioned charge pump method to perform a filtering process of analog adder to increase system SNR to reduce noise interference. In addition, because the added analog data (sensed voltages) already have amplification effect, it is not necessary to additionally dispose any amplifier in the touch sensing apparatus 1 to amplify the decoded analog data. Therefore, the die size can be shrunk to lower the cost.

It should be noticed that the operation of each storage control module 40 of the touch sensing apparatus 1 is the same. The logic control module 10 generates the storage control signal S2, so that the storage control module 40 can store the analog data in the storage capacitors respectively.

Next, single decoding control module 50 will be introduced. As shown in FIG. 2, the decoding control module 50 includes switches SW8~SW10 and a buffer A1. Wherein, the switch SW8 is coupled between the storage capacitor C1 and the buffer A1; the switch SW9 is a discharging switch coupled between the switch SW8 and the buffer A1; the switch SW10 is coupled between the buffer A1 and the analog/digital converting module 70.

In this embodiment, the switches SW8~SW10 are all under ON state, after the analog data stored in the storage capacitors C1~C3 are processed to form added analog data, the decoding control module 50 will switch off the switch SW8 according to the decoding control timing, so that the added analog data can be outputted to the buffer A1 and decoded by the decoding control module 50. Then, the switch SW10 is switch off and the decoded added analog data can be outputted to the analog/digital converting module 70.

It should be noticed that after the analog data stored in the storage capacitors C1~C3 are outputted to the buffer A1 and converted into the digital data S4 by the analog/digital converting module 70 and outputted to the logic control module 10, the decoding control module 50 will switch off the switches SW8 and SW9 to perform the discharging process on the storage capacitors C1~C3 to reduce the residual charges on the storage capacitors C1~C3.

Then, the analog/digital converting module 70 is used to convert the decoded added analog data into the digital data S4. In fact, the analog/digital converting module 70 can be any types of analog/digital converter without any limitations.

Afterward, the analog/digital converting module 70 outputs the converted digital data S4 to the logic control module 10. In fact, the logic control module 10 can include digital filter (not shown in figures) used for performing digital filtering to the digital data S4 to lower the interference of noise. It should be noticed that because the decoding control module 50 already uses the charge pump concept to realize the analog filtering and amplifying functions in an adding way to reduce the error of analog data, so that when the analog data is converted into digital data, the accuracy of digital data can be largely increased, so that the loading of the logic control module 10 of digital end can be reduced to enhance the touch accuracy of the touch sensing apparatus 1.

Compared to the prior arts, the touch sensing apparatus of the invention uses the charge pump concept to realize the function of analog adder, not only the interference to touch sensing caused by the noise generated by the liquid crystal panel and external environment can be effectively reduced, but also the reporting rate of the entire system will be not lowered and the power consumption will be increased, therefore, the touch sensing apparatus can sense the touch points on the touch panel more accurately to largely reduce the probability of misjudgment. In addition, because the touch sensing apparatus of the invention can obtain high SNR amplified analog data without any amplifier, the die size can be shrunk to lower the cost.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A touch sensing apparatus, comprising:
    a logic control module, for generating a plurality of control signals having different control timings, and the plurality of control signals comprising a storage control signal and a decoding control signal;
    at least one storage control module, coupled to the logic control module, each storage control module comprising a plurality of storage capacitors and respectively storing each of sensed voltages in different storage capacitors at different times according to a storage control timing of the storage control signal, wherein the sensed voltages are analog data sensed from scan lines of an ITO sensor; and
    at least one decoding control module, coupled to the logic control module and the at least one storage control module, for performing an analog adding process to the sensed voltages stored in the storage capacitors according to a decoding control timing of the decoding control signal to output a decoded analog data with high signal-to-noise ratio;
    wherein each decoding control module performs the analog adding process by using a charge pump method to add the sensed voltages stored in different storage capacitors to output the decoded analog data with high signal-to-noise ratio.

2. The touch sensing apparatus of claim 1, wherein each storage control module further comprises at least one adding switch, and each adding switch is coupled between two adjacent storage capacitors.

3. The touch sensing apparatus of claim 2, wherein after the storage control module stores each of sensed voltages in different storage capacitors at different times, the storage control module will switch off the at least one adding switch at a time, so that the storage capacitors can conduct to each other to add the sensed voltages stored in the storage capacitors.

4. The touch sensing apparatus of claim 1, wherein after the at least one decoding control module decodes all of the sensed voltages stored in the storage capacitors, the at least storage control module will perform a discharge process to the storage capacitors.

5. The touch sensing apparatus of claim 1, further comprising:
    a plurality of pins; and
    at least one driving/sensing control module, coupled to the logic control module and the plurality of pins, for receiving a driving/sensing control signal of the plurality of control signals from the logic control module and controlling the plurality of pins to perform a plurality of pin functions respectively according to a driving/sensing control timing of the driving/sensing control signal, so that the plurality of pins can sense the sensed voltages from the scan lines of the ITO sensor.

6. The touch sensing apparatus of claim 5, wherein the plurality of pin functions includes a driving function, a sensing function, a ground function, and a floating function.

7. The touch sensing apparatus of claim 1, further comprising:
an analog/digital converting module, coupled to the decoding control module and the logic control module, for converting the decoded analog data into a digital data and transmitting the digital data to the logic control module.

8. The touch sensing apparatus of claim 7, wherein the logic control module includes a digital filter used for performing a digital filtering process to the digital data to reduce noise interference.

9. The touch sensing apparatus of claim 1, wherein the logic control module generates the plurality of control signals having different control timings according to an external synchronizing signal.

10. A touch sensing apparatus, comprising:
a logic control module, for generating a plurality of control signals having different control timings, and the plurality of control signals comprising a storage control signal and a decoding control signal;
at least one storage control module, coupled to the logic control module, each storage control module comprising a plurality of storage capacitors and respectively storing each of sensed voltages in different storage capacitors at different times according to a storage control timing of the storage control signal, wherein the sensed voltages are analog data sensed from scan lines of an ITO sensor; and
at least one decoding control module, coupled to the logic control module and the at least one storage control module, for performing an analog adding process to the sensed voltages stored in the storage capacitors according to a decoding control timing of the decoding control signal to output a decoded analog data with high signal-to-noise ratio;
wherein each storage control module further comprises at least one adding switch, and each adding switch is coupled between two adjacent storage capacitors, after the storage control module stores each of sensed voltages in different storage capacitors at different times, the storage control module will switch off the at least one adding switch at a time, so that the storage capacitors can conduct to each other to add the sensed voltages stored in the storage capacitors.

* * * * *